Jan. 2, 1968  C. J. RENKEN, JR., ET AL  3,361,960
PULSED NONDESTRUCTIVE EDDY CURRENT TESTING DEVICE
USING SHIELDED SPECIMEN ENCIRCLING COILS
Filed July 9, 1964  4 Sheets-Sheet 1

INVENTORS
Claus J. Renken, Jr.
BY Allen Sather

Roland A. Anderson
Attorney

INVENTORS
Claus J. Renken, Jr.
Allen Sather
BY
Roland A. Anderson
Attorney

Jan. 2, 1968   C. J. RENKEN, JR., ET AL   3,361,960
PULSED NONDESTRUCTIVE EDDY CURRENT TESTING DEVICE
USING SHIELDED SPECIMEN ENCIRCLING COILS
Filed July 9, 1964   4 Sheets-Sheet 4

INVENTORS
Claus J. Renken, Jr.
Allen Sather
BY
Roland A. Anderson
Attorney

United States Patent Office 3,361,960
Patented Jan. 2, 1968

3,361,960
PULSED NONDESTRUCTIVE EDDY CURRENT TESTING DEVICE USING SHIELDED SPECIMEN ENCIRCLING COILS
Claus J. Renken, Jr., Orland Park, and Allen Sather, Plainfield, Ill., assignors to the United States of America as represented by the United States Atomic Energy Commission
Filed July 9, 1964, Ser. No. 381,600
10 Claims. (Cl. 324—40)

ABSTRACT OF THE DISCLOSURE

An eddy current testing device includes a first solid cylindrical magnetic-field shield having a hollow shaft along the longitudinal axis thereof, one end of the shield being terminated in a frustum. A second hollow cylindrical magnetic-field shield having one end thereof terminated in a frustum is aligned with the first shield along their longitudinal axes with their frustums in juxtaposition to define a narrow aperture between the vertices thereof. A transmitting coil is disposed about the aperture between the frustums of the shields and a receiving coil is disposed around the longitudinal axis of the second shield and mounted in the interior adjacent the sides of the frustum thereof. Means are provided for pulse excitation of the transmitting coil and for detecting signals received by the receiving coil, which signals are a measure of subsurface flaws existing in metal tubing as it passes through the shields along the longitudinal axes thereof.

*Contractual origin of the invention*

The invention herein was made in the course of, or under, a contract with the United States Atomic Energy Commission.

This invention relates to nondestructive eddy current testing devices and more particularly to a pulsed nondestructive eddy current testing device using specimen encircling coils.

When inspecting small diameter (below ¼″) tubing for subsurface flaws by eddy current nondestructive techniques, it is desirable to use a specimen encircling type coil, since with a point source probe, the specimen has to be rotated to accomplish an adequate inspection. In the conventional system, the specimen encircling coils are excited with a continuous wave signal and measurements are accomplished by measuring impedance changes of the coils. This type of measurement requires bridges or balance coils which are difficult to operate and keep balanced. Further, the surface resolution of such encircling coils is limited since to obtain a useable impedance change in the coil the coil has to have a minimum size, thereby limiting resolution.

Accordingly it is one object of the present invention to provide an improved eddy current testing device using specimen encircling coils.

It is another object of the present invention to provide an eddy current device using specimen encircling coils wherein no bridges or coil balancing means are required.

It is another object of the present invention to provide an eddy current device using pulsed specimen encircling coils.

It is another object of the present invention to provide an eddy current testing device using pulsed specimen encircling coils, which device is unaffected by specimen diameter changes or probe to sample spacing changes.

Other objects of the present invention will become more apparent as the detailed description proceeds.

In general the present invention comprises a first solid cylindrical shield having a hollow shaft along the longitudinal axis thereof, one end of said first shield being terminated in a frustum. A second hollow cylindrical shield is used having one end thereof terminated in a frustum. Means are provided for aligning said shields along their longitudinal axes with their frustrums in juxtaposition to define a narrow aperture between the vertexes thereof. A transmitting coil is disposed about the aperture between the frustums of said shields within the generating surfaces of the frustrums. A receiving coil is disposed around the longitudinal axis of said second shield and mounted in the interior adjacent the sides of the frustum thereof. Means are provided for pulse excitation of said transmitting coil and for detecting signals received by the receiving coil. The received signals are a measure of subsurface flaws existing in metal tubing as it passes through the shields along the longitudinal axes thereof.

More complete understanding of the invention will best be obtained from consideration of the accompanying drawings wherein.

Figure 1:
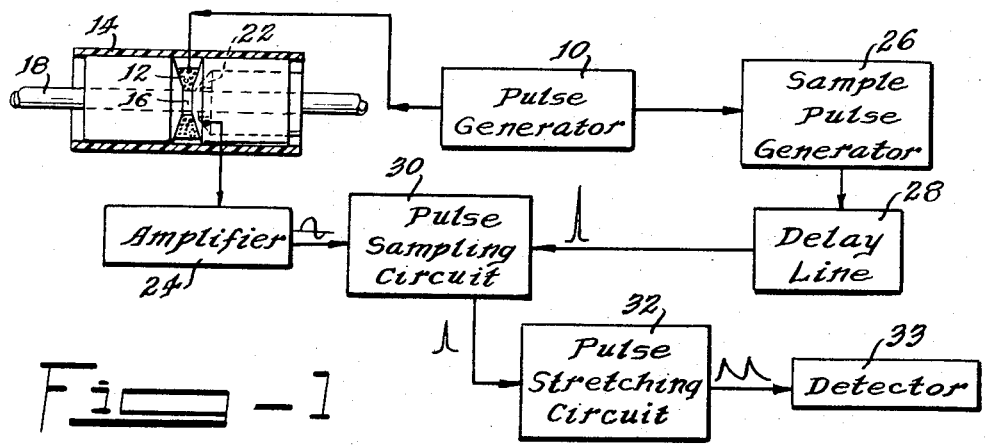
FIG. 1 is a block diagram of an apparatus for the present invention.
Figure 2:
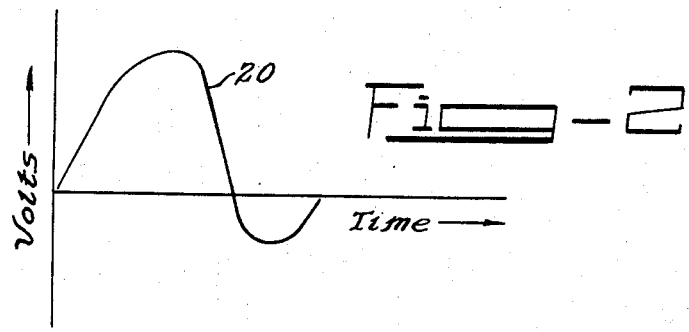
FIG. 2 is a typical reflected pulse envelope for the apparatus of FIG. 1.
Figure 3:
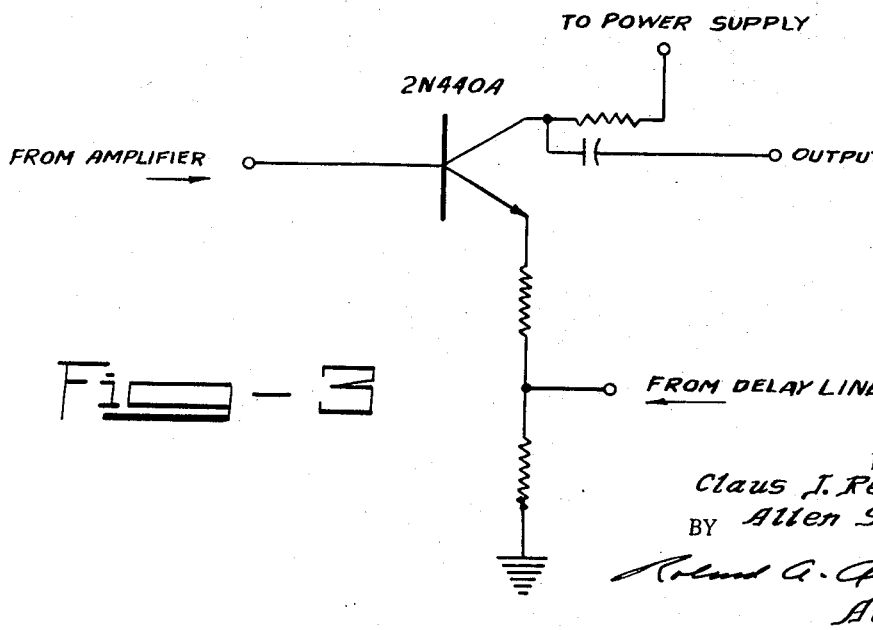
Figure 4:
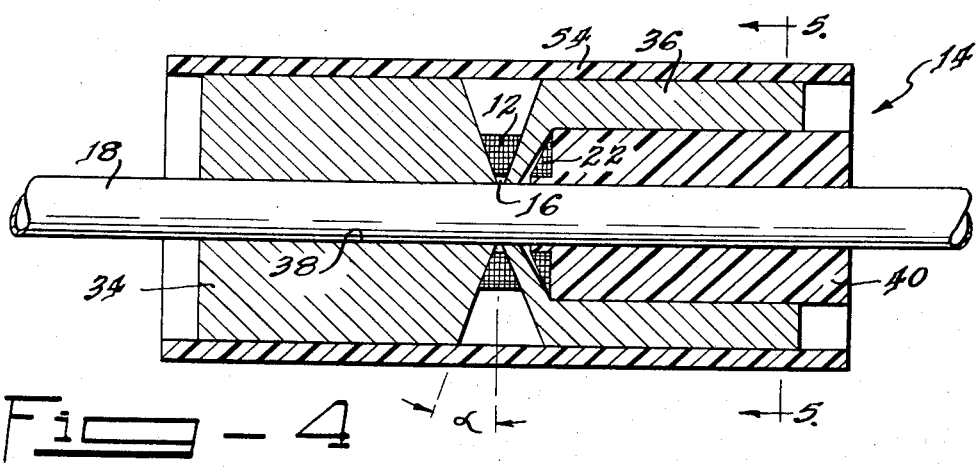
Figure 5:
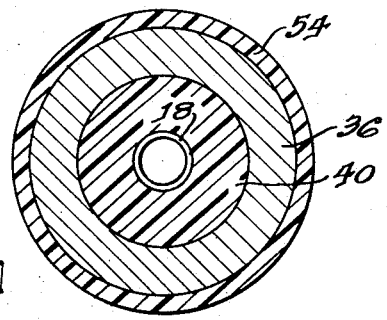
Figure 6:
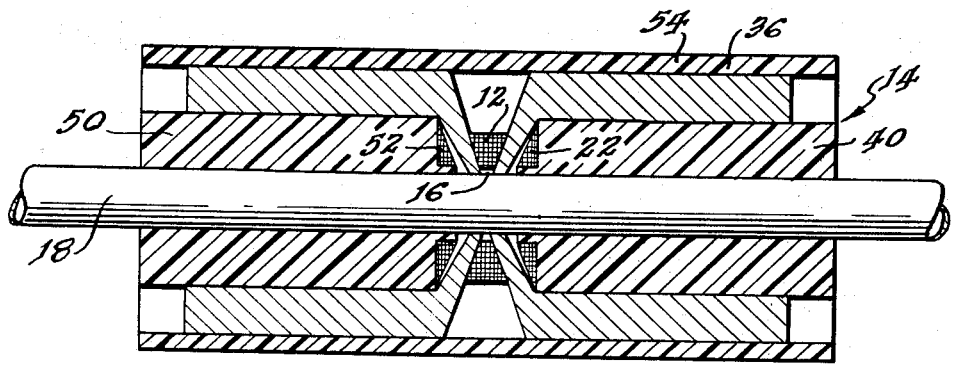
Figure 7:
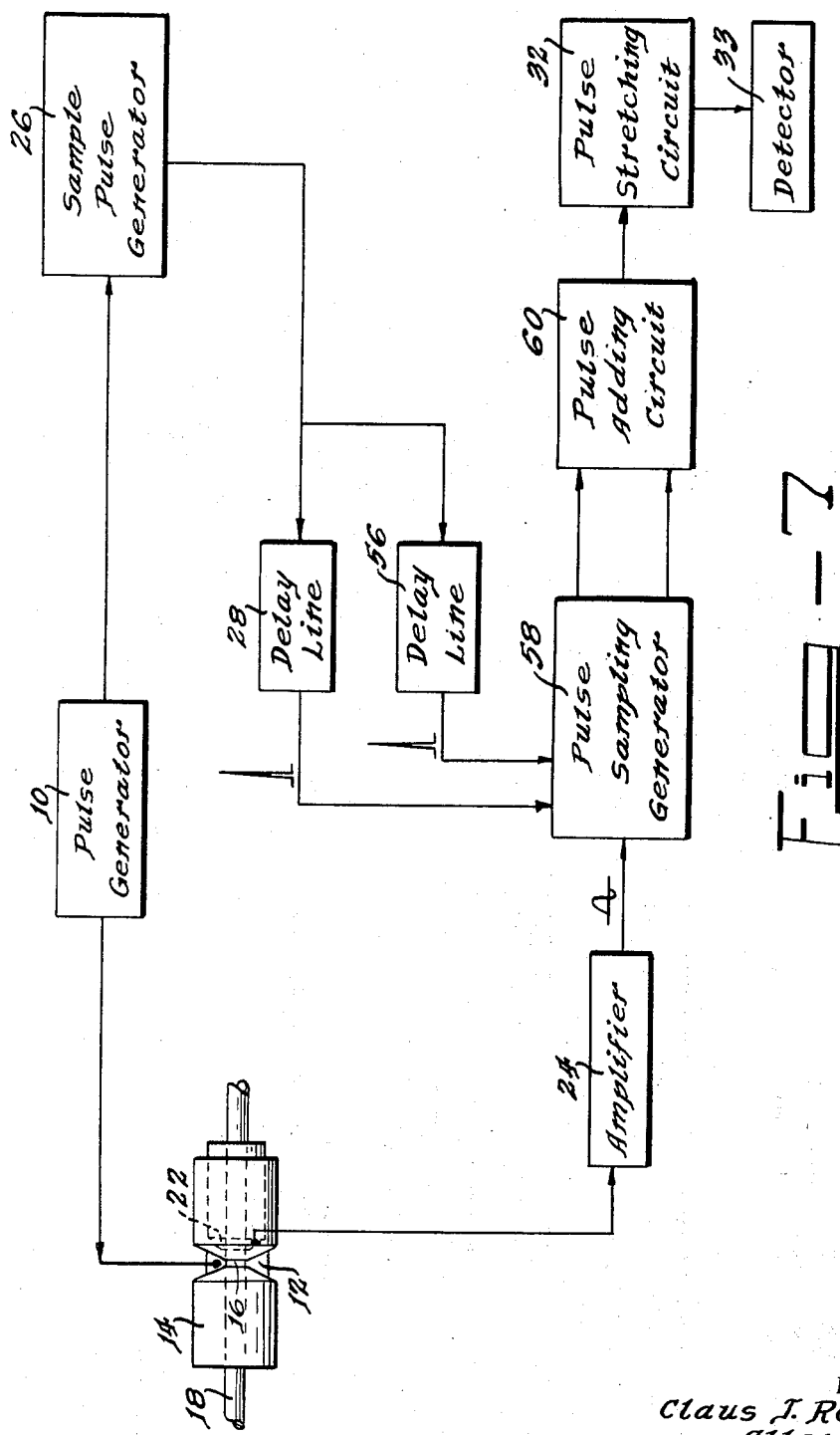
Figure 8:
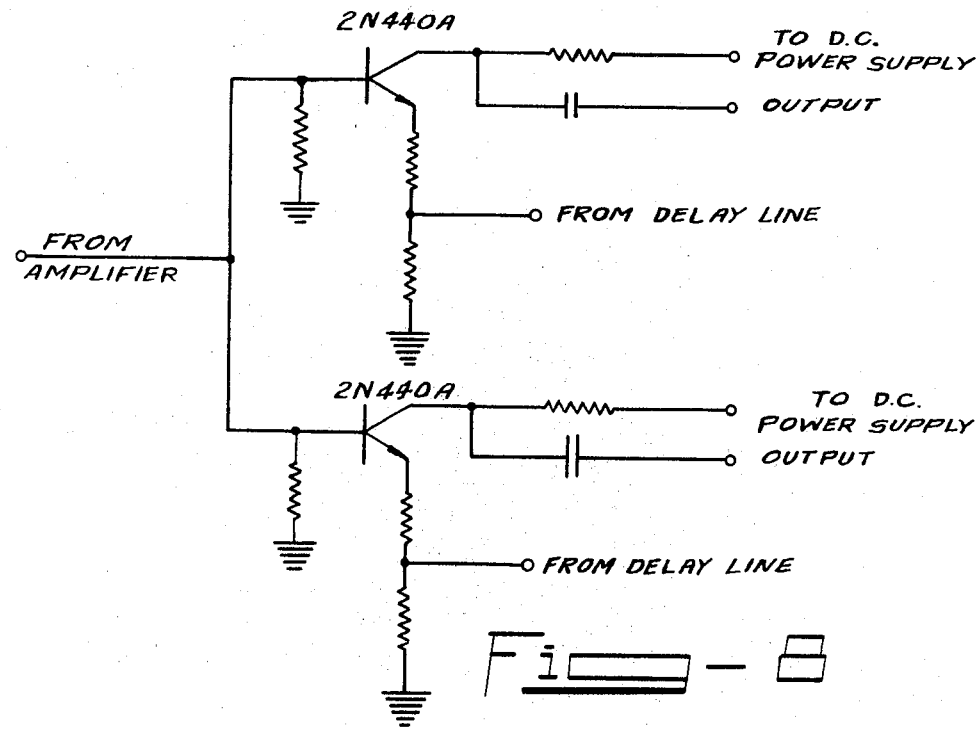
Figure 9:
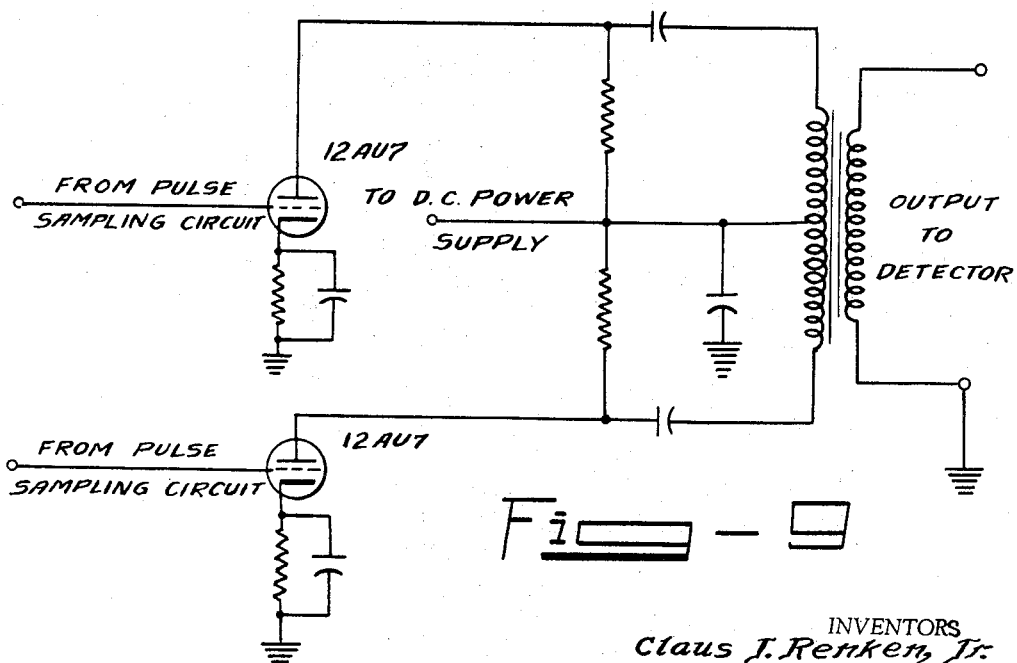

FIG. 3 is a detailed schematic diagram of the pulse sampling circuit for the embodiment of FIG. 1, FIG. 4 is a side cross-sectional view of the mask for the apparatus of FIG. 1, FIG. 5 is a sectional end view of FIG. 4 taken along line 5—5 thereof, FIG. 6 is a side cross-sectional view of the mask of FIG. 4 showing the modification thereof to permit the insertion therein of a second receiving coil, FIG. 7 is another embodiment of a device for the present invention, FIG. 8 is a detailed schematic diagram of the pulse sampling circuit for the embodiment of FIG. 7, and FIG. 9 is a detailed schematic diagram of the pulse adding circuit for the embodiment of FIG. 7, In FIG. 1, a pulse generator 10 generator pulses at a predetermined repetition rate and pulse duration. The pulses are fed to a specimen encircling transmitting coil 12 housed in an attenuating mask 14. A detailed description of the coil 12 and the mask 14 will be given later. The output from the transmitting coil 12, a series of pulsed electromagnetic fields, is transmitted through the aperture 16 of the mask 14 into a metal tubing specimen 18 passing through the longitudinal axis of the mask 14. These pulsed electromagnetic fields penetrate the metal tubing specimen 18 giving reflections therefor as shown in FIG. 2. The theory of penetration and reflection is the same as that set forth in pending application Ser. No. 149,129, now Patent No. 3,229,197. As noted therein, regardless of the depth of any flaw in the tubing specimen 18, such flaw is detectable by analysis of the retarded portion of the typical waveform 20 shown in FIG. 2. The retarded portion of waveform 20 shown in FIG. 2 is the negative portion thereof, though it is to be understood that it may equally be positive in polarity.

A receiving coil 22 mounted within the mask 14 and encircling the specimen 18 detects the reflected signals from the specimen 18 and transmits them to an amplifier 24.

When a pulse is generated by pulse generator 10 a trigger pulse is simultaneously generated therewith which gates a second pulse generator 26. Sample pulse generator 26 generates a single sampling pulse for each pulse generated by pulse generator 10. The duration of the sampling pulse is very short compared to the pulse generated by pulse generator 10 and in fact appears as a spike pulse with respect thereto. The amplitude of the spike pulse is, however, greater (3 to 4 times greater) than the pulse from pulse generator 10. The output from pulse generator 26 is fed through a variable delay line 28 to an input of a pulse sampling circuit 30. The pulse sampling circuit 30 is shown in schematic detail in FIG. 3. The output from amplifier 24 (the detected signal of receiving coil 22) is fed to a second input of pulse sampling circuit 30. The pulse sampling circuit 30 superposes the spike pulse of pulse generator 26 on the waveform of the signal detected by receiver 22 shown in FIG. 2. By varying the time delay of the spike pulse generated by pulse generator 26, the spike pulse may be positioned anywhere along the waveform of the received signal to sample a portion thereof. For detection of subsurface flaws the time delay of the spike pulse is adjusted so that the spike pulse is superposed in the retarded (negative) portion of the waveform of the typical received signal shown in FIG. 2. By superposing the spike pulse on a segment of the negative portion of the signal detected by receiver 22, the pulse sampling circuit 30 effectively combines the amplitudes of such segment and the spike pulse, thereby obtaining a signal responsive in amplitude to the presence of subsurface flaws within the tubing specimen 18.

The output of the pulse sampling circuit 30, a spike pulse, is fed to a pulse stretching circuit 32. The pulse stretching circuit 32 acts on the spike pulse output of pulse sampling circuit 30 to produce a saw-tooth waveform output responsive thereto. This saw-tooth waveform output is, like the spike pulse output of pulse sampling circuit 30, also responsive to the presence of subsurface flaws within tubing specimen 18. A suitable recording device 33 is used to monitor the amplitude of the sawtooth waveform output and thereby indicate the presence of subsurface flaws in the specimen 18.

It is to be understood that two encircling receiving coils may be employed in the present invention with their outputs being connected in series opposition. By using two receiving coils so connected, the operation of the present device is improved since by so doing the effects of specimen diameter changes and vibrations are diminished through compensation. The functioning and construction of the associated elements with a two receiving coil probe are otherwise as shown and described for FIG. 1.

The design and construction of the mask is shown in detail in FIGS. 4 and 5. FIG. 4 is a cross-sectional side view and FIG. 5 an end view of the probe for the device of the present invention shown in FIG. 1. Basically, the mask comprises two cylindrical copper shields 34 and 36. One of the shields (for example shield 34) has a shaft 38 bored therein along the longitudinal axis thereof wherethrough the test specimen 18 may pass. The top of cylindrical shield 34 is terminated in a frustrum as shown. The second shield 36 has the same external configuration as shield 34 but is hollowed out to permit the insertion therein of the receiving coil 22. The receiving coil 22 is wound on a Teflon tube insert 40. The Teflon tube 40 serves as a coil form for receiving coil 22 and also as a guide for the test specimen 18. When the Teflon tube 40 is inserted, the receiving coil 22 is mounted within the shield 36 close to the wall of the frustrum thereof as shown. The shields 34 and 36 are aligned along their longitudinal axes and brought into juxtaposition as shown until a small aperture 16 exists between the vertexes of the frustrums thereof.

A transmitting coil 12 is wound in the V shaped gap formed by the frustrum of the two shields 34 and 36 around the aperture 16 therebetween. The transmitting coil 12 is symmetrically disposed about the aperture 16 between the frustrums of the two shields 34 and 36 with its longitudinal axis parallel to the longitudinal axes of the shields 34 and 36.

The material of the shields 34 and 36 should be a conductor having electrical conductivity equal to or better than copper and the thickness of the walls thereof should be sufficient to permit no energy to pass therethrough. It is desirable that the aperture 16 be approximately $\frac{1}{64}$ of an inch wide. The angle of generation of the frustrums of shields 34 and 36 has not been found to be critical, though a generating angle $\alpha$ of 20° has been found satisfactory. It is to be noted that the position of the transmitting coil 12 is critical with respect to aperture 16. The strongest field is obtained when the coil 12 is symmetrically disposed about the aperture. The more off-center the coil 12 is mounted, the higher the field losses, and hence the poorer the operation of the device.

When a pulse is applied to the transmitting coil 12, a pulsed electromagnetic field emerges therefrom. The two shields 34 and 36 confine the electromagnetic field to a narrow area defined by the encircling aperture 16. Thus, as a tubing specimen 18 is passed through the shields, pulsed electromagnetic fields having a narrow width are radially delivered to the specimen 18. Reflections from such fields are detected by receiving coil 22 to denote the presence of subsurface flaws in specimen 18.

FIGS. 4 and 5 illustrate a single receiving coil mask. FIG. 6 shows the mask adapted for two receiving coils, the only change required being that shield 34 is hollowed out identical to shield 36 to permit the insertion of a Teflon tube 50 and receiving coil 52 therein. In both embodiments of the mask, a Micarta sleeve 54 is inserted around the shields 34 and 36 to maintain them as a single unit with proper spacings.

The aforementioned embodiment of FIG. 1 has been described and illustrated without compensation therein for changes in received signals caused by variations in the diameter of the tubing 18. The use of two receiving coils as hereinbefore described gives only limited compensation therefor. To effect compensation for such variations, the apparatus of FIG. 1 is modified to that shown in FIG. 7. The sample pulse generator 26 feeds its output pulse to two delay lines 28 and 56 instead of a single delay line 28 as in FIG. 1. The outputs of delay lines 28 and 56 are each fed to an input of a pulse sampling circuit 58. The received pulse output from amplifier 24 is also fed to an input of the pulse sampling circuit 30. Pulse sampling circuit 58 is shown in schematic detail in FIG. 8. Essentially, pulse sampling circuit 58 is two pulse sampling circuits 30 of FIG. 1 connected in parallel. Pulse sampling circuit 58, like its counterpart, pulse sampling circuit 30 in FIG. 1, superposes the spike pulse received from delay lines 28 and 56 on the waveform of the received pulse to effect a sampling of segments thereof. Delay line 28 is adjusted such that the spike pulse output therefrom maintains the same position along the waveform of the received pulse as in the embodiment of FIG. 1, to wit, in the retarded (negative) portion of such waveform. The delay line 56 is adjusted such that the spike pulse output thereof is superposed on the leading edge of the positive portion of the waveform of the received pulse. The leading edge of the positive portion of the waveform of the received pulse is responsive to variations in the diameter of the tubing 18. Accordingly, the spike pulse from delay line 56, when superposed on the leading edge of such waveform, generates a resultant spike pulse whose amplitude is responsive to variations in the diameter of the tubing 18. The spike pulse from delay line 28, as in the embodiment of FIG. 1, generates a resultant spike pulse whose amplitude is responsive to subsurface flaws in the specimen and also to variations in the diameter of the tubing 18. Thus, pulse sampling circuit 58 has two outputs, one responsive to variations in the diameter of tubing 18 and the other to variations in the diameter of tubing 18 and subsurface flaws in the tubing 18.

The two outputs of pulse sampling circuit 58 are then fed to the inputs of a pulse adding circuit 60. Pulse adding circuit 60 is shown in schematic detail in FIG. 9. Pulse adding circuit 60 operates to subtract the outputs of pulse sampling circuit 58 from each other, whereby the effect of variations in the diameter of tubing 18 is negated. Thus, the output of pulse adding circuit 60 is responsive only to the presence of subsurface flaws within the tubing specimen 18. The output of pulse adding circuit 60 is fed to the pulse stretching circuit 32 whose saw-tooth output is detected by a suitable detector 33 such as an oscilloscope. It is to be understood that the double receiving coil arrangement may also be combined with the embodiment of FIG. 7 to effect improved operation therefor as hereinbefore described.

Persons skilled in the art will, of course, readily adapt the general teachings of the invention to embodiments far different than the embodiments illustrated. Accordingly, the scope of the protection afforded the invention should not be limited to the particular embodiments illustrated in the drawings and described above, but should be determined only in accordance with the appended claims.

What is claimed is:

1. A device for detecting subsurface flaws in metal tubing comprising a transmitting coil spatially disposed around said tubing with the longitudinal axis thereof being essentially parallel to the longitudinal axis of said tubing, means for exciting said transmitting coil in a pulsed mode, shielding means disposed on both sides of said transmitting coil to permit only a portion of the pulsed electromagnetic fields resulting from pulsed excitation of said coil to be transmitted to said tubing, a receiving coil spatially disposed around said tubing adjacent said transmitting coil and spaced therefrom by said shielding means, and means for measuring signals detected by said receiving coil, which signals are indicative of the presence of subsurface flaws in said tubing.

2. A device for detecting subsurface flaws in metal tubing comprising a transmitting coil spatially disposed around said tubing with the longitudinal axis thereof being essentially parallel to the longitudinal axis of said tubing, means for generating electrical pulses at a predetermined repetition rate, means for applying said pulses to said transmitting coil, shielding means disposed about said transmitting coil to permit only a portion of the pulsed electromagnetic fields resulting from said pulses applied to said transmitting coil to be transmitted to said tubing, a receiving coil spatially disposed around said tubing adjacent said transmitting coil, said receiving coil detecting reflected pulsed electromagnetic fields from said tubing due to said transmitted pulsed electromagnetic fields, means for generating a spike pulse for each of said generated electrical pulses, each of said spike pulses being greater in amplitude but less in time duration than said electrical pulses, means for superposing each of said spike pulses on a predetermined segment of pulses detected by said receiving coil to generate an output signal responsive in amplitude to the combination of said segment and the spike pulse superposed thereon, and means for recording said output signal, which signal is responsive to the presence of subsurface flaws in said tubing.

3. A device for detecting subsurface flaws in metal tubing comprising a transmitting coil spatially disposed around said tubing with the longitudinal axis thereof being essentially parallel to the longitudinal axis of said tubing, means for generating electrical pulses at a predetermined repetition rate, means for applying said pulses to said transmitting coil, shielding means disposed about said transmitting coil to permit only a portion of the pulsed electromagnetic fields resulting from said pulses applied to said transmitting coil to be transmitted to said tubing, a receiving coil spatially disposed around said tubing adjacent said transmitting coil, said receiving coil detecting reflected pulsed electromagnetic fields from said tubing due to said transmitted pulsed electromagnetic fields, means for generating first and second spike pulses for each of said generated electrical pulses, each of said first and second spike pulses being greater in amplitude but less in time duration than said electrical pulses, means for superposing said first spike pulse on a predetermined segment of the leading edge of pulse detected by said receiving coil to generate a first output signal responsive in amplitude to the combination of said leading edge segment and said first spike pulse superposed thereon, means for superposing said second spike on a predetermined segment in the negative portion of pulses detected by said receiving coil to generate a second output signal responsive in amplitude to the combination of said negative portion segment and said second spike pulse superposed thereon, means for subtracting said first and second output signals from each other, and means for recording the resultant subtracted signal, which signal is responsive to the presence of subsurface flaws in said tubing and nonresponsive to tube diameter variations.

4. The device according to claim 3 further including a second receiving coil spatially disposed around said tubing adjacent said transmitting coil, and means for connecting said receiving coils in series opposition to produce a resultant received signal reflected from said tubing.

5. A device for detecting subsurface flaws in metal tubing comprising a first solid cylindrical shield having a hollow shaft along the longitudinal axis thereof, one end of said shield being terminated in a frustrum, a second hollow cylindrical shield having one end thereof terminated in a frustrum, means for aligning said shields along their longitudinal axes with their frustrums in juxtaposition to define a narrow aperture between the vertexes thereof, a transmitting coil disposed around the aperture between the frustrums of said shields upon the generating surfaces of said frustrums, the longitudinal axis of said transmitting coil being essentially parallel to the longitudinal axes of said shields, a receiving coil disposed around the longitudinal axis of said second shield and mounted in the interior adjacent the sides of the frustrum thereof, means for exciting said transmitting coil in a pulsed mode, and means for measuring signals detected by the receiving coil, which detected signals are indicative of the presence of subsurface flaws in said tubing as it is passed through said shields along the longitudinal axes thereof.

6. The device according to claim 5 wherein the aperture between the vertexes of the frustrums of said shields is approximately 1/64 of an inch.

7. The device according to claim 6 wherein said transmitting coil is symmetrically disposed around the aperture between the frustrums of said shields upon the generating surfaces of said frustrums.

8. The device according to claim 7 wherein said first shield is a hollow cylindrical shield having one end thereof terminated in a frustrum, a second receiving coil disposed around the longitudinal axis of said first shield and mounted in the interior adjacent the sides of the frustrum thereof, means for connecting said receiving coils in series opposition, and means for measuring the resultant signals detected by said receiving coils, which resultant signals are indicative of the presence of subsurface flaws in said tubing as it is passed through said shields along the longitudinal axes thereof.

9. A device for measuring subsurface flaws in metal tubing comprising a first solid cylindrical shield having a hollow shaft along the longitudinal axis thereof, one end of said shield being terminated in a frustrum, a second hollow cylindrical shield having one end thereof terminated in a frustrum, means for aligning said shields along their longitudinal axes with their frustrums in juxtaposition to define a narrow aperture between the vertexes thereof, a transmitting coil symmetrically disposed around the aperture between the frustrums of said shields upon the generating surfaces of said frustrums, the longitudinal axis of said transmitting coil being essentially parallel to the longitudinal axes of said shields, a receiving coil disposed around the longitudinal axis of said second shield and mounted in the interior adjacent the sides of the frustrum thereof, means for generating electrical pulses at a predetermined repetition rate, means for applying said pulses to said transmitting coil, means for generating a spike pulse for each of said generated electrical pulses, each of said spike pulses being greater in amplitude but less in time duration than said electrical pulses, means for superposing each of said spike pulses on a predetermined segment of pulses detected by said receiving coil to generate an output signal respuonsive in amplitude to the combination of said segment and the spike pulse superposed thereon, and means for recording said output signal, which signal is responsive to the presence of subsurface flaws in said tubing as it passes through said shields along the longitudinal axes thereof.

10. A device for measuring subsurface flaws in metal tubing comprising a first solid cylindrical shield having a hollow shaft along the longitudinal axis thereof, one end of said shield being terminated in a frustrum, a second hollow cylindrical shield having one end thereof terminated in a frustrum, means for aligning said shields along their longitudinal axes with their frustrums in juxtaposition to define a narrow aperture between the vertexes thereof, a transmitting coil symmetrically disposed around the aperture between the frustrums of said shields upon the generating surfaces of said frustrums, the longitudinal axis of said transmitting coil being essentially parallel to the longitudinal axes of said shields, a receiving coil disposed around the longitudinal axis of said second shield and mounted in the interior adjacent the sides of the frustrum thereof, means for generating electrical pulses at a predetermined repetition rate, means for applying said pulses to said transmitting coil, means for generating first and second spike pulses for each of said generated electrical pulses, said first and second spike pulses being greater in amplitude but less in time duration than said generated electrical pulses, means for superposing said first spike pulse on a predetermined segment of the leading edge of pulses detected by said receiving coil to generate a first output signal responsive in amplitude to the combination of said leading edge segment and said first spike pulse superposed thereon, means for superposing said second spike pulse on a predetermined segment in the negative portion of pulses detected by said receiving coil to generate a second output signal responsive in amplitude to the combination of said negative portion segment and said second spike pulse superposed thereon, means for subtracting said first and second output signals from each other, and means for recording the resultant subtracted signal, which signal is responsive to the presence of subsurface flaws in said tubing as it is passed through said shields along the longitudinal axes thereof and is nonresponsive to variations in the diameter of said tubing.

References Cited

UNITED STATES PATENTS 2,790,140  4/1957  Bender _____ 324—34

RUDOLPH V. ROLINEC, *Primary Examiner.*

R. J. CORCORAN, *Assistant Examiner.*